(12) United States Patent
Soubaras

(10) Patent No.: US 8,593,904 B2
(45) Date of Patent: Nov. 26, 2013

(54) METHOD AND DEVICE TO ACQUIRE SEISMIC DATA

(75) Inventor: Robert Soubaras, Massy (FR)

(73) Assignee: CGGVeritas Services SA, Massy Cedex (FR)

( * ) Notice: Subject to any disclaimer, the term of this patent is extended or adjusted under 35 U.S.C. 154(b) by 0 days.

(21) Appl. No.: 13/464,149

(22) Filed: May 4, 2012

(65) Prior Publication Data

US 2012/0218858 A1    Aug. 30, 2012

Related U.S. Application Data

(63) Continuation of application No. 13/272,428, filed on Oct. 13, 2011.

(60) Provisional application No. 61/392,982, filed on Oct. 14, 2010.

(51) Int. Cl.
*G01V 1/38* (2006.01)

(52) U.S. Cl.
USPC .............................................................. 367/16

(58) Field of Classification Search
USPC ............. 367/15, 16, 19, 117, 130, 17, 20, 21, 367/24, 48, 50, 131; 702/14, 17; 114/246; 254/274
See application file for complete search history.

(56) References Cited

U.S. PATENT DOCUMENTS

| | | | |
|---|---|---|---|
| 2,614,165 A | 10/1952 | Doolittle | |
| 3,299,399 A | 1/1967 | Bowers | |
| 3,491,848 A | 1/1970 | Giles | |
| 3,885,515 A | 5/1975 | Caldwell, Jr. et al. | |
| 4,068,208 A | 1/1978 | Rice, Jr. et al. | |
| 4,101,866 A | 7/1978 | Ruehle | |
| 4,233,677 A | 11/1980 | Brown et al. | |
| 4,254,480 A | 3/1981 | French | |
| 4,353,121 A | 10/1982 | Ray et al. | |
| 4,404,664 A * | 9/1983 | Zachariadis | 367/19 |
| 4,486,863 A * | 12/1984 | French | 367/15 |

(Continued)

FOREIGN PATENT DOCUMENTS

| | | |
|---|---|---|
| EP | 0365270 A2 | 4/1990 |
| EP | 1426786 A1 | 6/2004 |

(Continued)

OTHER PUBLICATIONS

Cole et al., "A Circular Seismic Acquisition Technique for Marine Three-Dimensional Surveys," Offshore Technology Conference 4864, 1985, pp. 217-220.*

(Continued)

*Primary Examiner* — Isam Alsomiri
*Assistant Examiner* — Daniel L Murphy
(74) *Attorney, Agent, or Firm* — Patent Portfolio Builder, PLLC

(57) ABSTRACT

Streamer and method for deploying the streamer for seismic data acquisition related to a subsurface of a body of water. The method includes a step of releasing into the body of water, from a vessel, a body having a predetermined length together with plural detectors provided along the body; a step of towing the body and the plural detectors such that the plural detectors are submerged; and a step of configuring plural birds provided along the body, to float at a predetermined depth from a surface of the water such that a first portion of the body has a curved profile while being towed underwater.

30 Claims, 14 Drawing Sheets

(56) References Cited

U.S. PATENT DOCUMENTS

| | | | |
|---|---|---|---|
| 4,486,865 A | 12/1984 | Ruehle | |
| 4,532,617 A | 7/1985 | Baecker et al. | |
| 4,581,723 A * | 4/1986 | Savit | 367/20 |
| 4,635,236 A | 1/1987 | Roberts | |
| 4,872,144 A | 10/1989 | Young et al. | |
| 4,884,249 A | 11/1989 | Snook | |
| 4,979,150 A | 12/1990 | Barr | |
| 4,992,992 A | 2/1991 | Dragoset, Jr. | |
| 5,257,241 A | 10/1993 | Henderson et al. | |
| 5,930,731 A | 7/1999 | Brzostowski | |
| 5,959,938 A | 9/1999 | Behrens | |
| 6,024,344 A | 2/2000 | Buckley et al. | |
| 6,049,507 A | 4/2000 | Allen | |
| 6,088,299 A | 7/2000 | Erath et al. | |
| 6,317,695 B1 | 11/2001 | Zhou et al. | |
| 6,456,565 B1 | 9/2002 | Grall et al. | |
| 6,574,567 B2 | 6/2003 | Martinez | |
| 6,754,590 B1 | 6/2004 | Moldoveanu | |
| 6,775,618 B1 | 8/2004 | Robertsson et al. | |
| 7,372,769 B2 | 5/2008 | Grion | |
| 7,400,552 B2 * | 7/2008 | Moldoveanu et al. | 367/16 |
| 7,417,924 B2 | 8/2008 | Vigen et al. | |
| 7,599,798 B2 | 10/2009 | Beasley et al. | |
| 7,660,189 B2 | 2/2010 | Vigen et al. | |
| 2005/0027454 A1 | 2/2005 | Vaage et al. | |
| 2006/0239122 A1 | 10/2006 | Vigen et al. | |
| 2007/0165486 A1 | 7/2007 | Moldoveanu et al. | |
| 2007/0189374 A1 | 8/2007 | Comparsi De Castro et al. | |
| 2008/0253225 A1 | 10/2008 | Welker et al. | |
| 2008/0279045 A1 | 11/2008 | Vigen et al. | |
| 2008/0300821 A1 | 12/2008 | Frank et al. | |
| 2009/0161488 A1 | 6/2009 | Ferber et al. | |
| 2009/0175124 A1 | 7/2009 | Sorli | |
| 2009/0231953 A1 | 9/2009 | Welker et al. | |
| 2009/0323467 A1 | 12/2009 | Goujon et al. | |
| 2010/0002537 A1 | 1/2010 | Welker | |
| 2010/0054082 A1 | 3/2010 | McGarry et al. | |
| 2010/0135112 A1 | 6/2010 | Robertsson | |
| 2011/0176384 A1 | 7/2011 | Soubaras | |
| 2011/0305109 A1 | 12/2011 | Soubaras | |
| 2012/0213033 A1 | 8/2012 | Soubaras | |
| 2012/0218859 A1 | 8/2012 | Soubaras | |
| 2012/0224454 A1 | 9/2012 | Soubaras | |

FOREIGN PATENT DOCUMENTS

| | | |
|---|---|---|
| EP | 2352040 A2 | 8/2011 |
| FR | 2955396 A1 | 7/2011 |
| FR | 2955397 A1 | 7/2011 |
| FR | 2961316 A1 | 12/2011 |
| GB | 1588462 | 4/1981 |
| GB | 2425839 A | 11/2006 |
| WO | 2007006785 A2 | 1/2007 |
| WO | 2011086166 A1 | 7/2011 |

OTHER PUBLICATIONS

International Search Report mailed on Aug. 31, 2012 in related application No. PCT/EP2011/068031.

International Search Report mailed on Apr. 21, 2011 in related application No. PCT/EP2011/050480.

US Office Action mailed on Aug. 13, 2012 in related U.S. Appl. No. 13/471,561.

US Office Action mailed on Aug. 8, 2012 in related U.S. Appl. No. 13/008,099.

US Office Action mailed on Aug. 3, 2012 in related U.S. Appl. No. 13/464,109.

US Office Action mailed on Aug. 17, 2012 in related U.S. Appl. No. 13/155,778.

US Office Action mailed on Aug. 15, 2012 in related U.S. Appl. No. 13/464,126.

GB Search Report mailed on Nov. 11, 2011 in related Application No. GB1117501.5.

Dan Ebrom et al.; Facilitating Technologies for Permanently Instrumented Oil Fields; The Leading Edge; vol. 19, No. 3; Mar. 2000; XP002590895; pp. 282-285.

International Search Report mailed on Sep. 10, 2010 and issued in application No. PCT/EP2010/058174.

French Preliminary Search Report mailed on Jul. 8, 2010 and issued in French Application No. 1050278.

Jim Leinbach; "Wiener Spiking Deconvolution and Minimum-phase Wavelets: a Tutorial", The Leading Edge, vol. 14, No. 3 pp. 189-192, Mar. 1995.

Robert Soubaras, "Veriable-depth streamer: deep towing and efficient deghosting for extended bad with" Aug. 2010.

Robert Soubaras, "Deghosting by joint deconvolution of a migration and a mirror migration" Aug. 2010, SEG Denver 2010 Annual Meeting.

International Search Report mailed on Sep. 19, 2011 and issued in application No. PCT/EP2011/059528.

Written Opinion of the International Search Authority mailed on Sep. 19, 2011 and issued in application No. PCT/EP2011/059528.

Daniel Trad "Interpolation and multiple attenuation with migration operators" Geophysics, SEG, vol. 68, No. 6, Nov.-Dec. 2003, pp. 2043-2054.

U.S. Final Office Action issued Feb. 4, 2013 in related U.S. Appl. No. 13/464,109.

U.S. Final Office Action issued Feb. 4, 2013 in related U.S. Appl. No. 13/471,561.

R. Soubaras, et al.; "Variable Depth Streamer Acquisition: Enhancing Interpretation with broadband marine seismic"; GeoConvention 2012; May 2012, Vision.

M. Wong, et al.; "Least-squares Reverse Time Migration/Inversion for Ocean Bottom Data; a Case Study"; 2011 SEG Annual Meeting; Sep. 18-23, 2011 , San Antonio, Texas.

M. Wong, et al.; "Joint least—squares inversion of up- and downgoing signal for ocean bottom data sets"; SEG Technical Program Expanded Abstracts 2010; Oct. 17-22, 2010 , Denver, Colorado; pp. 2752-2756.

U.S. Office Action issued on Dec. 6, 2012 in related U.S. Appl. No. 13/464,126.

U.S. Office Action issued on Dec. 6, 2012 in related U.S. Appl. No. 13/155,778.

US 6,456,564, 09/2002, Grall et al. (withdrawn)

* cited by examiner

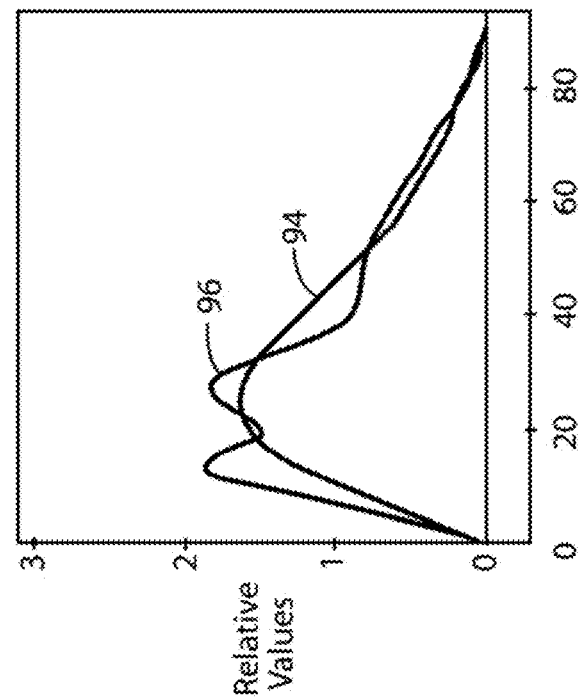
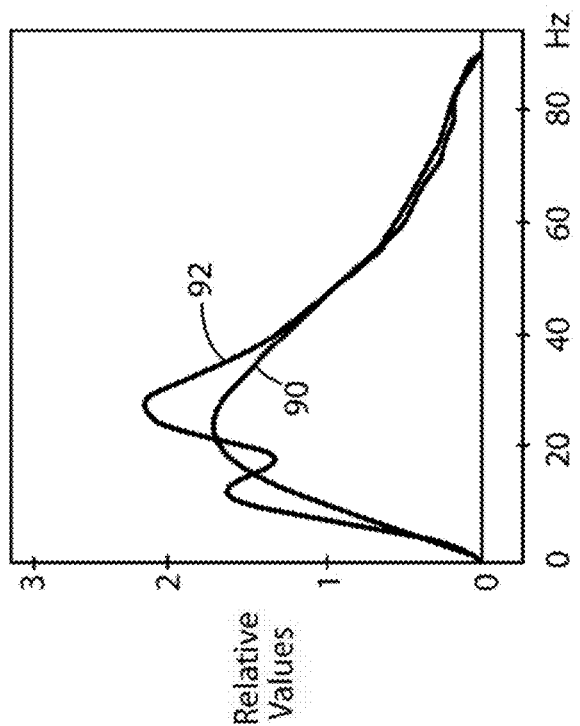

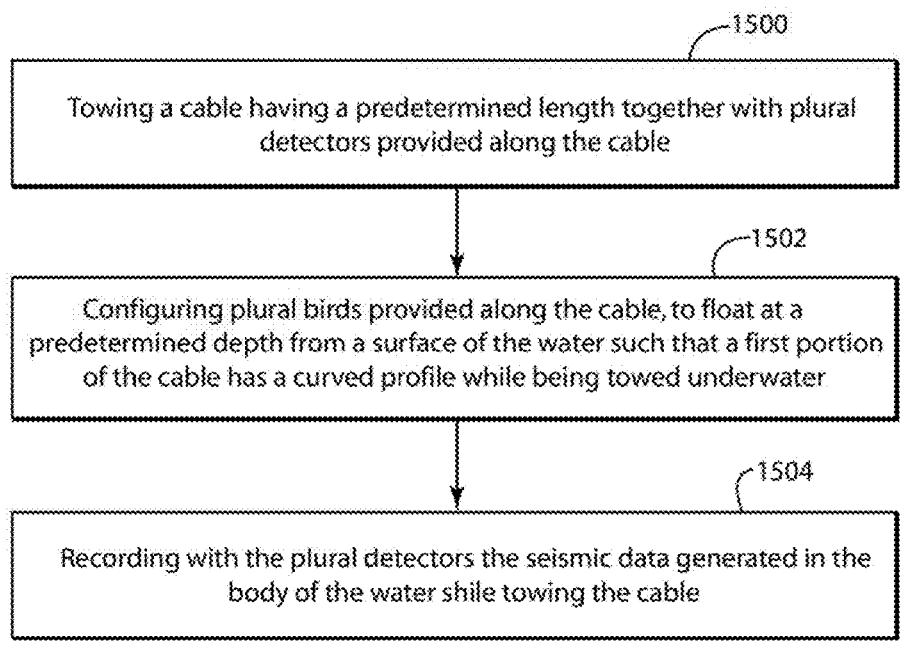

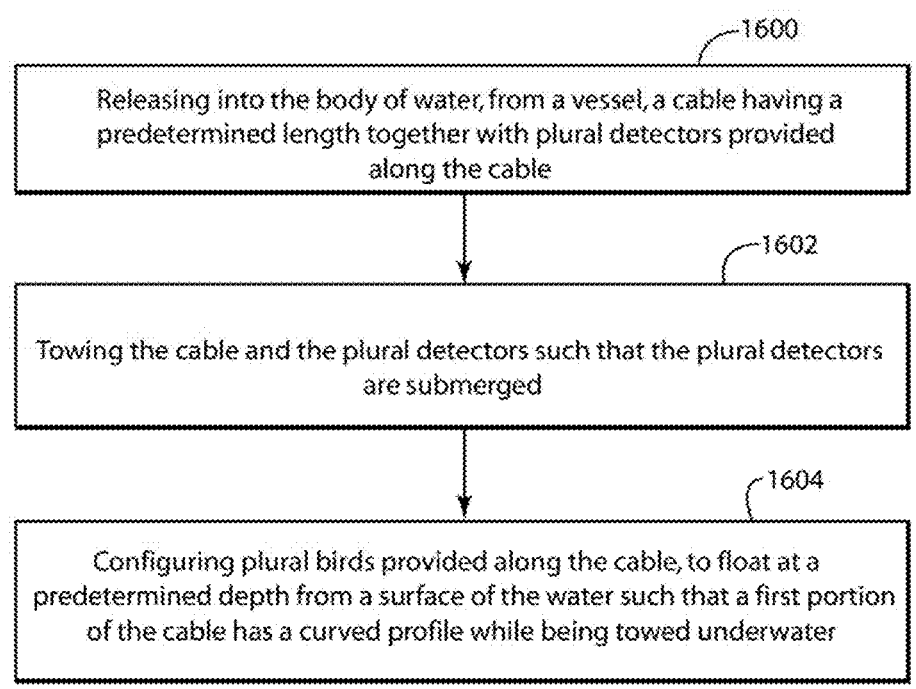

METHOD AND DEVICE TO ACQUIRE SEISMIC DATA

CROSS REFERENCE TO RELATED APPLICATIONS

The present application is a continuation of U.S. patent application Ser. No. 13/272,428 filed on Oct. 13, 2011, which claims the benefit of priority of U.S. Provisional Application 61/392,982, having the title "Method and Device to Acquire Seismic Data," and being authored by R. Soubaras, the entire content of which is incorporated herein by reference.

BACKGROUND

1. Technical Field

Embodiments of the subject matter disclosed herein generally relate to methods and systems and, more particularly, to mechanisms and techniques for acquiring seismic data.

2. Discussion of the Background

During the past years, the interest in developing new oil and gas production fields has dramatically increased. However, the availability of land-based production fields is limited. Thus, the industry has now extended drilling to offshore locations, which appear to hold a vast amount of fossil fuel. Offshore drilling is an expensive process. Thus, those engaged in such a costly undertaking invest substantially in geophysical surveys in order to more accurately decide where to drill in order to avoid a dry well.

Marine seismic data acquisition and processing generate a profile (image) of the geophysical structure (subsurface) under the seafloor. While this profile does not provide an accurate location for the oil and gas, it suggests, to those trained in the field, the presence or absence of oil and/or gas. Thus, providing a high resolution image of the subsurface is an ongoing process for the exploration of natural resources, including, among others, oil and/or gas.

During a seismic gathering process, as shown in FIG. 1, a vessel 10 tows an array of acoustic detectors 12. The array of acoustic detectors 12 is disposed along a body 14. Body 14 together with its corresponding detectors 12 are sometimes referred to, by those skilled in the art, as a streamer 16. The vessel 10 may tow plural streamers 16 at the same time. The streamers may be disposed horizontally, i.e., lying at a constant depth $z_1$ relative to a surface 18 of the ocean. Also, the plural streamers 16 may form a constant angle (i.e., the streamers may be slanted) with respect to the surface of the ocean as disclosed in U.S. Pat. No. 4,992,992, the entire content of which is incorporated herein by reference. FIG. 2 shows such a configuration in which all the detectors 12 are provided along a slanted straight body 14 making a constant angle α with a reference horizontal line 30.

With reference to FIG. 1, the vessel 10 may also tow a sound source 20 configured to generate an acoustic wave 22a. The acoustic wave 22a propagates downward and penetrates the seafloor 24, eventually being reflected by a reflecting structure 26 (reflector R). The reflected acoustic wave 22b propagates upwardly and may be detected by detector 12. For simplicity, FIG. 1 shows only two paths 22a corresponding to the acoustic wave. However, the acoustic wave emitted by the source 20 may be substantially a spherical wave, e.g., it propagates in all directions starting from the source 20. Parts of the reflected acoustic wave 22b (primary) are recorded by the various detectors 12 (the recorded signals are called traces) while parts of the reflected wave 22c pass the detectors 12 and arrive at the water surface 18. Since the interface between the water and air is well approximated as a quasi-perfect reflector (i.e., the water surface acts as a mirror for the acoustic waves), the reflected wave 22c travels back towards the detector 12 as shown by wave 22d in FIG. 1. Wave 22d is normally referred to as a ghost wave because this wave is due to a spurious reflection. The ghosts are also recorded by the detector 12, but with a reverse polarity and a time lag relative to the primary wave 22b. The degenerative effect that ghost waves have on bandwidth and resolution of seismic measurements are known. In essence, interference between primary and ghost arrivals causes, among other problems, notches, or gaps, in the frequency content of the data recorded by the detectors.

The traces may be used to determine the subsurface (i.e., earth structure below surface 24) and to determine the position and presence of reflectors 26. However, the ghosts disturb the accuracy of the final image of the subsurface and for at least this reason, various methods exist for removing the ghosts, i.e., deghosting, from the results of a seismic analysis.

The streamer configuration illustrated in FIG. 2 is considered to provide a more accurate data acquisition then the configuration illustrated in FIG. 1. One reason for this difference is the fact that for each reflector, a time gap between the detection of the primary and ghost reflections becomes greater, the further the detector 12 is from the source 20, due to the slanted disposition of the detectors, thus facilitating deghosting.

However, the slanted streamer shown in FIG. 2 has the following limitation, which makes it impracticable. Current streamers have a typical length on the order of 6 to 10 km. Using a slanted streamer as suggested in U.S. Pat. No. 4,992,992, e.g., with a slope of 2 degrees relative to the horizontal line 30, would lead to a depth of about 280 m for the last detector, while in reality current marine detectors are designed to operate in water depths up to about 50 m. Thus, for current streamers, the approach proposed in the '992 patent would require detectors to be located in water depths beyond their current capabilities, thus resulting in detectors failure or the impossibility to provide the detectors at those depths.

In order to accurately locate deep reflectors, high-frequency acoustic waves are not suitable on account of the high attenuation they undergo during their propagation. Thus, low-frequency acoustic waves are desired to be present in the spectrum recorded by the detectors. Therefore, an octave is desirable to be gained in the low-frequency range of the traditional methods, thereby increasing the conventional bandwidth of 5-40 Hz to, e.g., a bandwidth of 2.5-40 Hz. To gain the extra octave, it is possible to increase the depth of the streamer. However, it is not sufficient to give priority to low-frequencies since high-frequencies are needed to estimate precisely the velocity model of the surface layers. Also, the signal-to-noise ratio should be improved for low-frequency acoustic waves without deteriorating it for the high-frequency acoustic waves.

Therefore, although a slanted streamer may partially extend the above-discussed bandwidth due to the constant depth increase of the detectors relative to the surface of the water, additional limitations exist in the approach proposed by the '992 patent, as further illustrated below.

FIGS. 3 and 4 illustrate the simulated effect of ghosts on the frequency spectrum (herein referred to as "effective spectrum") corresponding to a shallow reflector (disposed at a depth of about 800 m) for a slanted streamer after stacking (stacking is a process in which different traces corresponding to the same common point are added together to reduce noise and improve overall data quality). In other words, spectra 34 and 38 correspond to different depths of the detectors with no ghosts while spectra 36 and 40 correspond to the same different depths of the detectors but with ghosts. These spectrum simulations are for a streamer having the first detector placed at a depth relative to the surface of the water of about 7.5 m and about 15 m. It is noted that relative values of the amplitudes of the frequencies are plotted against the frequencies in FIGS. 3 and 4. In both of the ghost free simulations (34 and 38), the last detector on the slanted streamer is placed at a depth of about 37.5 m relative to the water surface. The ghost free simulated spectra (curves 34 and 38, respectively) neglect the ghost effect, i.e., represent an "idealized" situation in which the presence of ghosts has been artificially removed from the simulation, so as to show the deficiencies of the conventional data acquisition methods. The effective spectra 36 and 40 are calculated without artificially removing the effect of the ghosts. As clearly shown in FIGS. 3 and 4, the two spectra 34 and 36 of the first configuration have different shapes as the effective spectrum 36 includes less energy for the low-frequencies (lower than about 10 Hz) and high-frequencies (higher than about 60 Hz) as compared to the ghost free simulated spectrum 34. As the final image of the subsurface is sensitive to the low- and high-frequencies, two spectra that have these portions different from each other are considered to be different and thus, the data corresponding to the effective spectrum 36 does not produce an accurate final image of the subsurface.

An advantage of increasing the depth of the first detector is to minimize the effect of swell noise, e.g., noise produced by swells at the surface of the water. The swell noise is known to mainly affect detectors close to the surface of the water. A simulated spectrum 38 for this situation and a corresponding effective spectrum 40 are shown in FIG. 4. However, even for this case, the effective spectrum 40 shows a notch at about 45 to 50 Hz that corresponds to a detector having a depth of about 15 m.

For a reflector at a depth of about 15 m, the data recorded by the detectors relatively close to the seismic source may have an overriding influence in stacking as the distant receivers make a less important contribution. Therefore, for a shallow reflector, mostly the recordings of the detectors positioned in the head portion of the streamer (closest to the vessel) are used. This means that the depth dynamics of the detectors, which determine the diversity of the notches, are insufficient for good quality ghost elimination.

As can be seen from the above summarized illustrative discussion, a substantial disparity at low- and high-frequencies of the spectrum are still present when using streamers with a constant slant, which results in a poor final image of the subsurface. Accordingly, it would be desirable to provide systems and methods that avoid or significantly reduce the afore-described problems and drawbacks of the conventional systems.

SUMMARY

According to an exemplary embodiment, there is a streamer for collecting seismic data related to a subsurface of a body of water. The streamer includes a body having a predetermined length; plural detectors provided along the body; and plural birds provided along the body. The birds are configured to float, when deployed under water, at predetermined depths from a surface of the water such that a first portion of the body has a curved profile while being towed underwater.

According to another exemplary embodiment, there is a method for seismic data acquisition related to a subsurface of a body of water. The method includes a step of towing a body having a predetermined length together with plural detectors provided along the body; a step of configuring plural birds provided along the body, to float at predetermined depths from a surface of the water such that a first portion of the body has a curved profile while being towed underwater; and a step of recording with the plural detectors the seismic data generated in the body of the water while towing the body.

According to still another exemplary embodiment, there is a method for deploying a streamer for seismic data acquisition related to a subsurface of a body of water. The method includes releasing into the body of water, from a vessel, a body having a predetermined length together with plural detectors provided along the body; towing the body and the plural detectors such that the plural detectors are submerged; and configuring plural birds provided along the body, to float at predetermined depths from a surface of the water such that a first portion of the body has a curved profile while being towed underwater.

According to still another exemplary embodiment, there is a streamer for collecting seismic data related to a subsurface of a body of water. The streamer includes a body having a predetermined length; plural detectors provided along the body; and plural birds provided along the body. The streamer is configured to flow underwater when towed such that the plural detectors are distributed along a curved profile described by (i) a depth $z_0$ of a first detector, (ii) a slope $s_0$ of a first portion of the body with an axis parallel with a surface of the body of water, and (iii) a predetermined horizontal distance $h_c$ between the first detector and an end of the curved profile.

According to yet another exemplary embodiment, there is a streamer for collecting seismic data related to a subsurface of a body of water. The streamer includes a body having a predetermined length; plural detectors provided along the body; and plural birds provided along the body. The streamer is configured to flow underwater when towed such that the plural detectors are distributed along a first portion and a second portion of the body. The first portion has a slanted profile with a first slope and the second portion has a slanted profile with a second slope different from the first slope.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 12 and 13 are graphs showing a frequency spectrum for a streamer with multiple slants at different depths according to exemplary embodiments;

FIG. 15 is a flow chart illustrating a method for seismic data acquisition according to an exemplary embodiment; and FIG. 16 is a flow chart illustrating a method for deploying a streamer according to an exemplary embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a streamer having a profile that varies with depth, at least initially. However, the embodiments to be discussed next are not limited to these structures, but may be applied to other structures that have detectors provided at a variable depth.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a plurality of detectors provided (attached or build into the streamer) on a streamer and configured to be distributed at variable depths, on a curved profile, relative to a horizontal line (e.g., surface of the water). It is noted that the detectors may follow the curved profile while the streamer may not, e.g., the actual body of the streamer to which the detectors are attached may deviate from the curved profile but an imaginary line drawn to have the curved profile may intersect most if not all of the receivers. As will be discussed later, some of the detectors may not lie exactly on the curved profile and may deviate from the curved profile within an acceptable range. In another exemplary embodiment, the profile of the curve on which the plurality of detectors is distributed is parameterized as will be discussed later in more details. According to still another exemplary embodiment, a ramp rate of the distribution of the detectors varies along the streamer.

Figure 5:
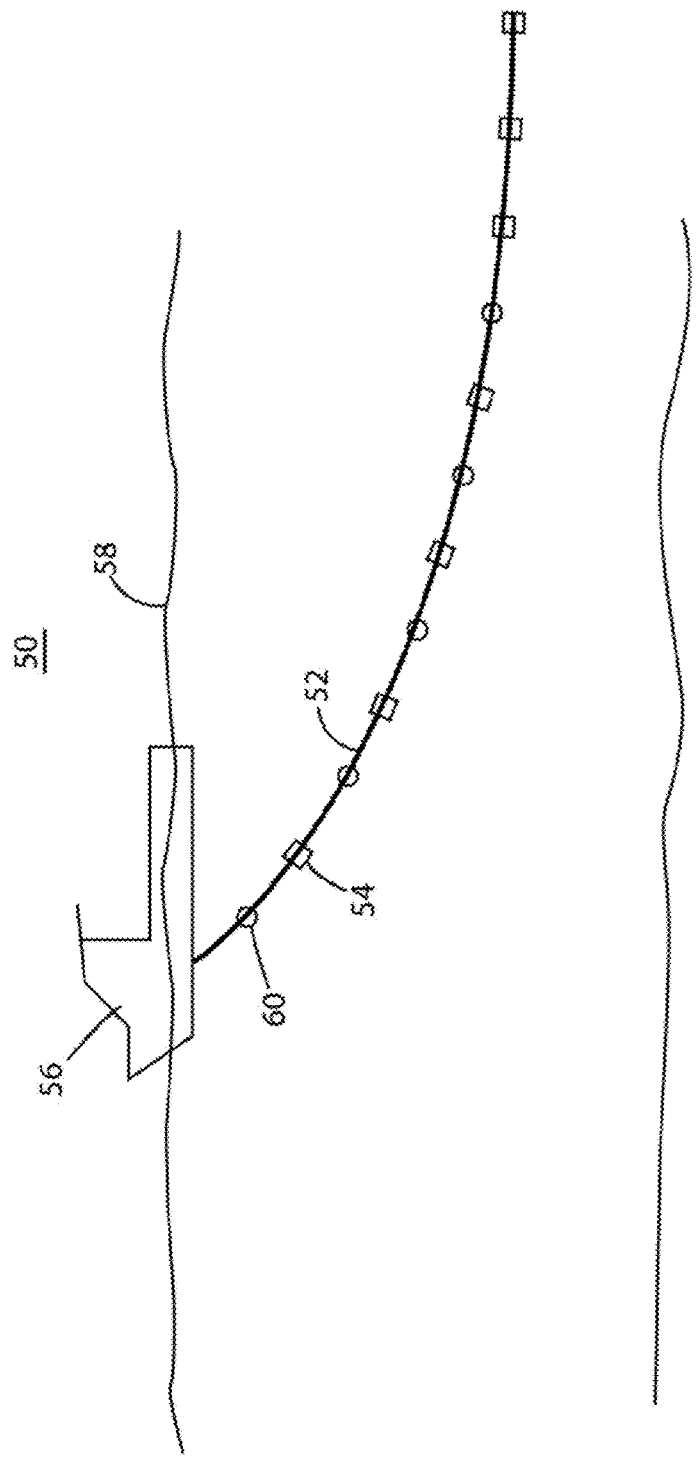
FIG. 5 is a schematic diagram of a seismic data acquisition system having a curved streamer according to an exemplary embodiment.

According to an exemplary embodiment, a streamer having part of the detectors provided on a curved profile is shown in FIG. 5. FIG. 5 shows a system 50 having at least one streamer 52. The streamer 52 includes a body (e.g., cable) on which at least one detector 54 is provided. For simplicity, both the streamer and body are identified by the same reference number 52. However, as discussed with regard to FIG. 5, the streamer may include both the body and the detectors. In one application, the streamer includes plural detectors 54. The streamer 52 may be connected to a vessel 56 for being towed under the water surface 58. Towing the streamer 52 under water is different from lying down ocean bottom cables at least for the following reason. The distribution of some of the detectors on a curved profile as discussed in the previous embodiments is maintained substantially unchanged while towing the streamer contrary to the situation when lying down cables and detectors. In this last situation, the operator of the streamer is not interested to use a certain profile for the detectors' distribution or to maintain that profile.

In one exemplary embodiment, a distance between consecutive detectors 54 is constant. However, in another application, a distance between consecutive detectors 54 varies. For example, the distance between consecutive detectors at the beginning and end of the body may be smaller than a distance between consecutive detectors in the middle of the streamer. A distance between two consecutive detectors may be in the range of meters or tens of meters. A length of the streamer may be in the order of kilometers.

In order to achieve the curved profile shown in FIG. 5, plural birds 60 (or equivalents, like deflectors, etc.) may be provided along the streamer. A bird may be simply a weight that sinks a corresponding part of the streamer to a desired depth assuming that the body floats in normal conditions. Alternatively, the bird may be a more or less sophisticated device configured to maintain a desired depth under water as well as separation between streamers in applications using multiple streamers. For example, the bird may have wings or other devices for manoeuvring up, down, left, right, etc. The bird, similar to the detectors, may be electrically connected to the vessel for control and/or data collection. In another embodiment, the birds are self powered with the use of individual batteries.

A detector is a generic name for any device that is capable of measuring a pressure wave or another quantity (e.g., particle velocity or displacement of the medium) indicating the presence of an acoustic wave. An example of such a detector is a geophone or a hydrophone or an accelerometer and they are known in the art. Thus, a detailed description of these devices is not provided herein.

The curved shape of the streamer 52 may have different profiles as discussed next. It is noted that the curved shape of the streamer is achieved while towing the streamer underwater. In other words, this curved shape of the streamer should not be confused with a situation when plural detectors connected to a cable (ocean bottom cable) is deployed on the bottom of the ocean for passive measurements as noted above.

Figure 6:
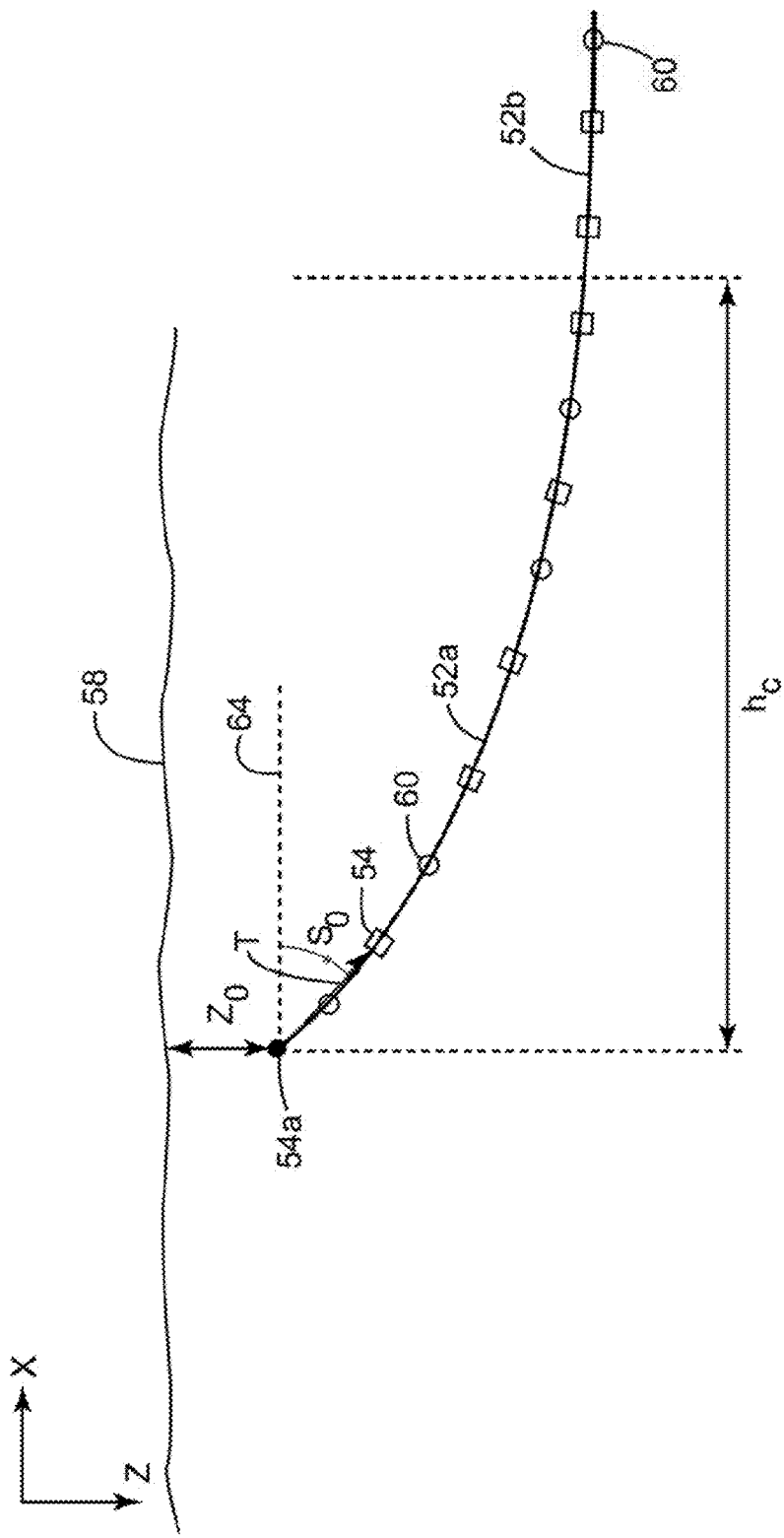
FIG. 6 is a schematic diagram of a seismic data acquisition system having a curved streamer according to another exemplary embodiment.

In one exemplary embodiment illustrated in FIG. 6, the curved profile of the streamer 52 may be defined by three parametric quantities, $z_0$, $s_0$ and $h_c$. It is noted that not the entire streamer has to have the curved profile. In other words, the curved profile should not be construed to always apply to the entire length of the streamer. While this situation is possible, the exemplary embodiments do not prohibit having the curved profile applied to only a portion of the streamer. In other words, the streamer may have (i) only a curved profile or (ii) a portion having the curved profile and a portion having a flat profile, the two portions being attached to each other.

The first parameter $z_0$ indicates the depth of a first detector 54a of the streamer relative to the surface 58 of the water. This parameter may have a value in the range of meters to tens of meters. For example, $z_0$ may be around 6 m. However, as would be recognized by those skilled in the art, the value of $z_0$ depends on each application and may be related to the depth of the bottom of the ocean, the depth of the reflectors, the power of the sound source, the length of the streamer, etc.

The second parameter $s_0$ is related to the slope of the initial part of the streamer 52 relative to a horizontal line 64. If the parameter $s_0$ is the slope, as illustrated in FIG. 6, it is related to an angle made by a tangent T to an initial part of the streamer and the horizontal line 64. It is noted that the slope of the curved profile at point 54a is given by a ratio of the change of the curved profile along the Z axis with respect to the change along the X axis. The slope is thus equal to the mathematical value of the tangent of the angle, i.e., slope (at point 54a in FIG. 6)=tan (of corresponding angle). Further, it is noted that for small angles (e.g., five or less degrees), tan (angle) is approximately equal to $s_0$. Thus, for small angles, the slope and the angle may be used interchangeably. In one embodiment, the value of $s_0$ may be between 0 and 6 percent. The example shown in FIG. 6 has an initial slope $s_0$ equal to substantially 3 percent. It is noted that the profile of the streamer 52 in FIG. 6 is not drawn to scale as a slope of 3 percent is a relatively small quantity. In one application, the slope may be constant for a certain length of the streamer and then it can change until approaching zero.

Figure 7:
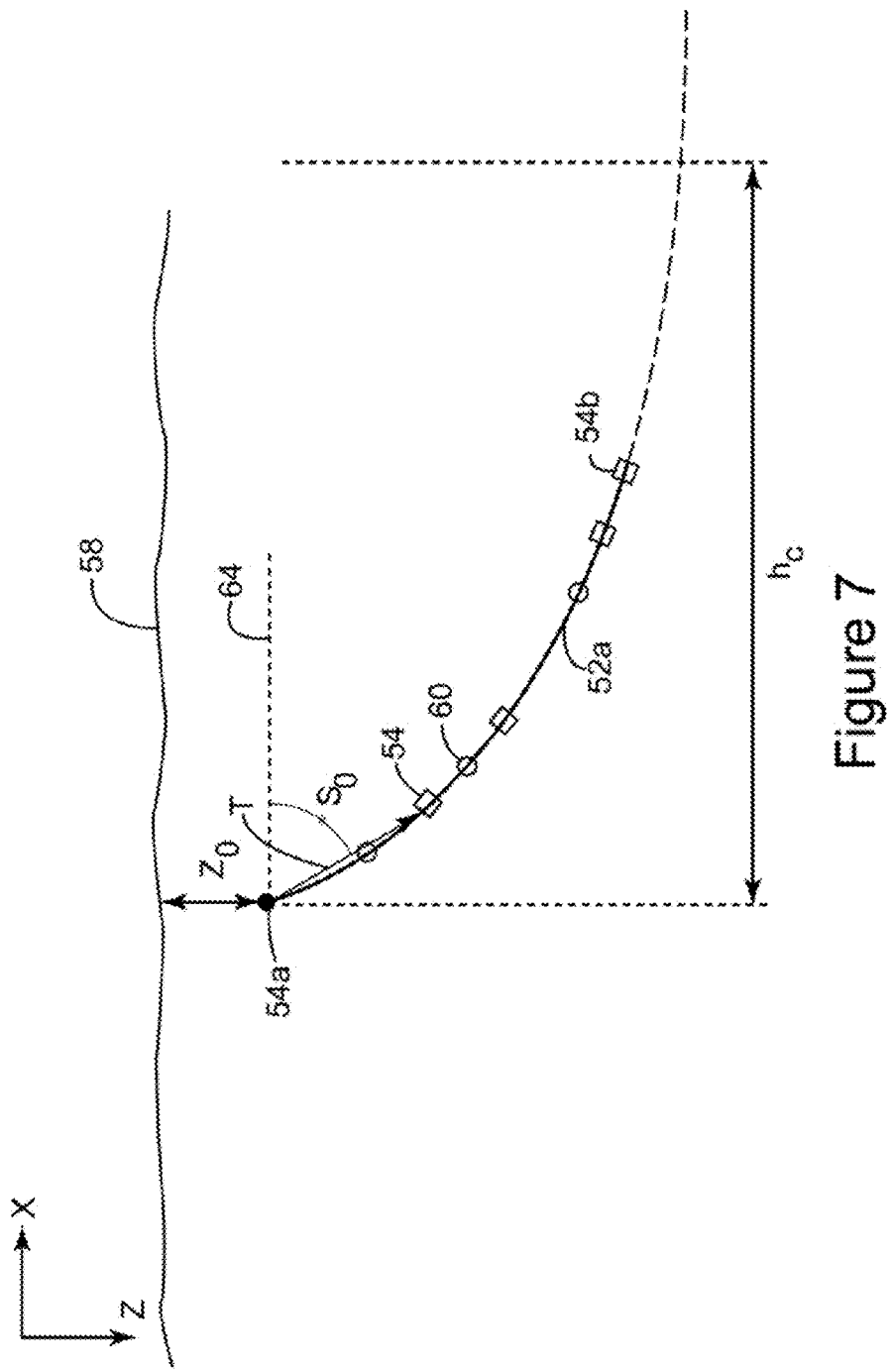
FIG. 7 is a schematic diagram of a seismic data acquisition system having a curved streamer according to still another exemplary embodiment.

The third parameter $h_c$ indicates a horizontal length (distance along the X axis in FIG. 6 measured from the first detector 54a of the curved portion of the streamer until an end of the curved portion. This parameter may be in the range of hundreds to thousands of meters. For example, $h_c$ is around 3000 m for the configuration shown in FIG. 6. This parameter defines the end of the curved part of the streamer 52. In other words, the streamer 52 may have a first portion 52a that has a first curved profile and a second portion 52b that is either flat or has a different curved profile. Parameter $h_c$ defines the first portion 52a. It is noted that in one application the streamer 52 has both the first portion 52a and the second portion 52b while in another application the streamer 52 has only the first portion 52a. Such an embodiment is illustrated in FIG. 7 in which the detectors 54 lie only on the first portion 52a, the detector 54b being the last detector on the streamer 52. It is noted that a projection along line 64 of the length of the streamer 52 in FIG. 7 may be less than $h_c$. In other words, in some embodiments, the streamer does not extend along the entire curved profile, i.e., a length of the streamer projected on X axis is less than $h_c$.

According to another exemplary embodiment, the curved profile of the streamer 52 may be described, approximately, by the following equations:

$$z(h) = z_0 + s_0 h\left(1 - 0.5\left(\frac{h}{h_c}\right)\right) \text{ for } h \le h_c, \text{ and} \quad (1)$$

$$z(h) = z_0 + s_0 \cdot 0.5 \cdot h_c \text{ for } h > h_c. \quad (2)$$

Figure 8:
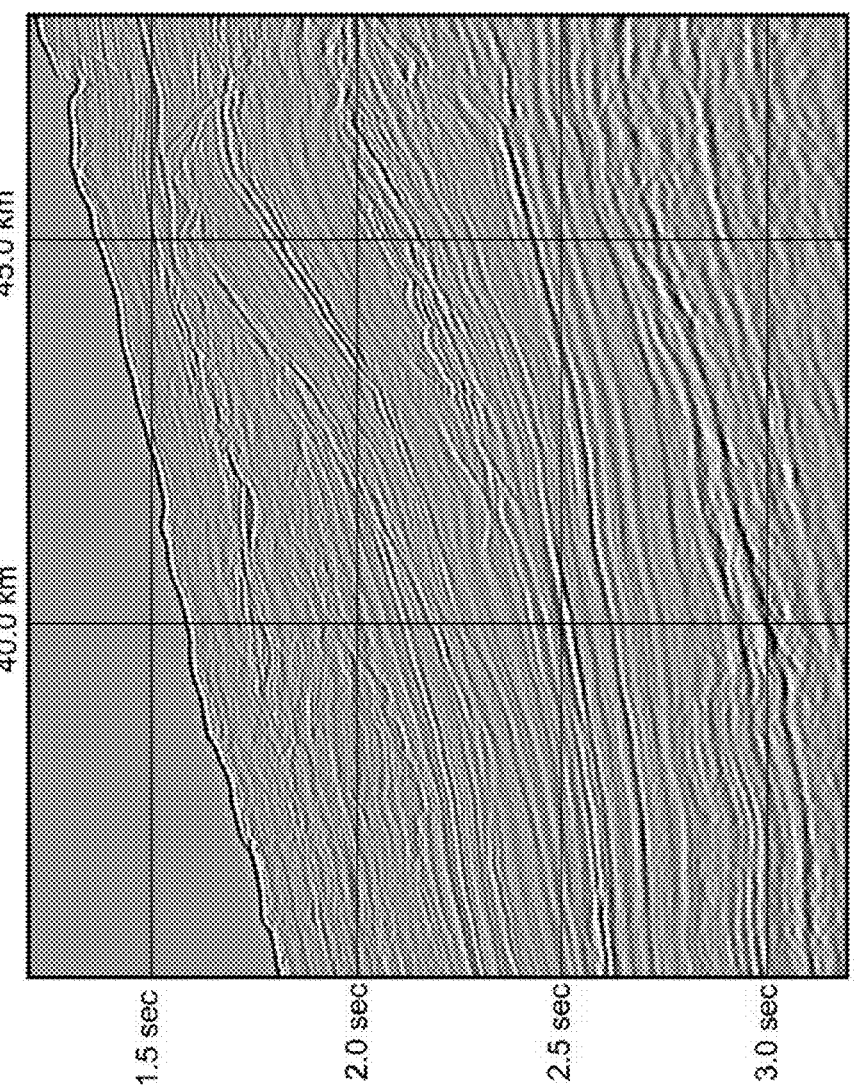
FIG. 8 is an image of a subsurface according to a conventional streamer configuration.
Figure 9:
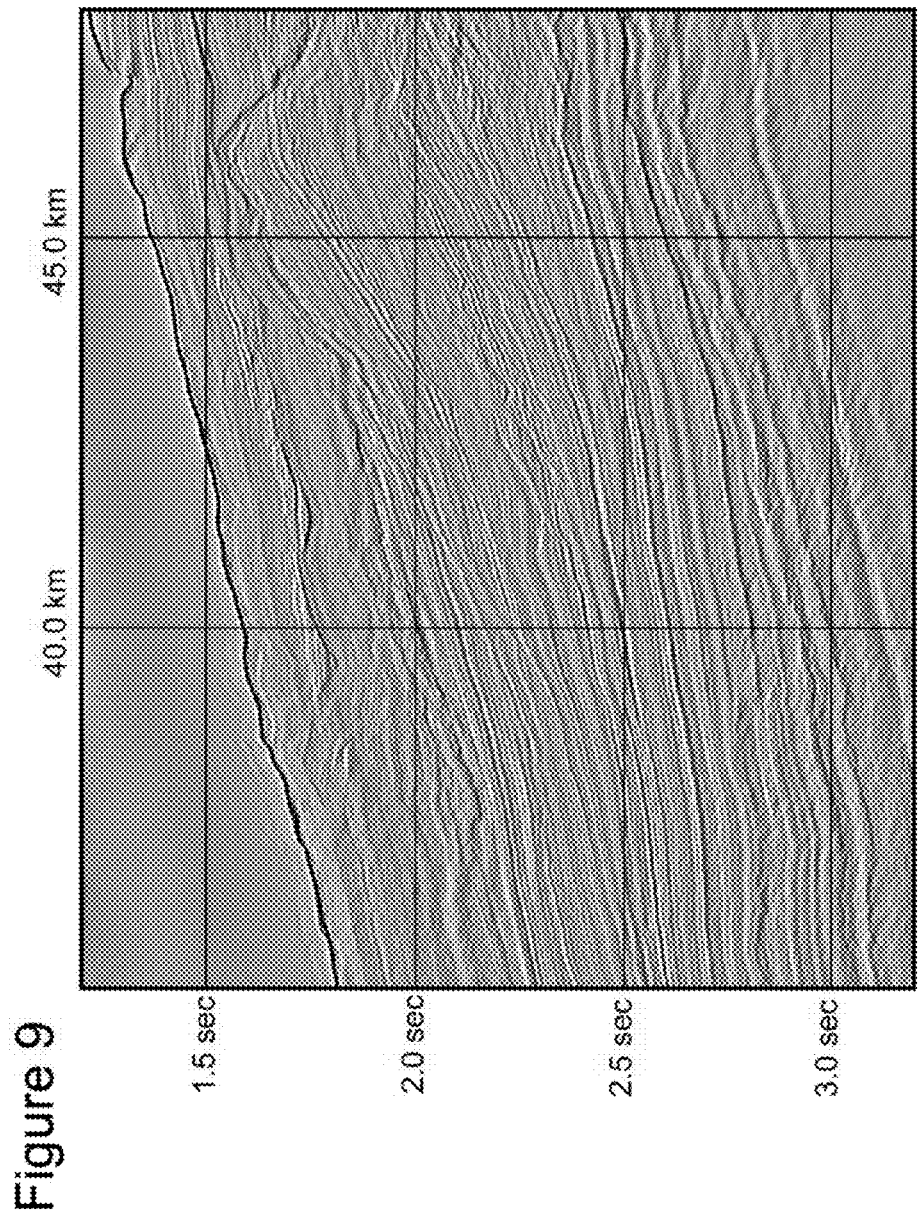
FIG. 9 is an image of the same subsurface according to a novel streamer configuration.

In these equations, z is measured along the Z axis and h is measured along the X axis, where Z is perpendicular to the surface of the water and X extends, along the surface of the water. Also, it is noted that in some applications, only equation (1) may be used to define the profile of the streamer, depending on the length of the streamer. In other words, in some embodiments, the streamer does not have to have a flat portion or other portions at the end of the curved portion. For seismic data acquired with streamers disposed along a profile given by these specific equations, it was found that the clarity of the processed images of the subsurface improved substantially, as shown in FIGS. 8 and 9. It is noted that FIG. 8 illustrates the final image of the subsurface obtained with traditional acquisition devices while FIG. 9 illustrates the final image of the same subsurface using the novel acquisition device described above. Further, it is noted that the first equation (1) provides the curved profile while the second equation (2) provides a straight line (constant depth).

Those skilled in the art would understand that the values provided by equations (1) and (2) are approximate as the detectors are under constant motion exerted by various water currents and the movement of the vessel. In other words, it is understood that detectors provided substantially on the curved profile described by equation (1) and/or (2), e.g., at positions as close as 10 to 20% to the real curve in terms of the actual depth z(h), are envisioned to be covered by the above mentioned equations.

In another exemplary embodiment, z(h) may be generally described by a parabola, a hyperbola, a circle, or any other curved line. In one exemplary embodiment, the curved profile may be formed by two or more different curved profiles, e.g., a parabola combined with a circle, etc.

In another exemplary embodiment, the birds 60 that are attached to the streamer 52 are placed at specific locations so that the streamer takes the desired curved profile, e.g., parabola, hyperbola, circle, etc. For example, if the circle is the profile of the curved streamer, a radius of curvature may be around 50 km. Thus, according to this exemplary embodiment, the detectors may not be exactly located on the desired curved profile but substantially thereon, e.g., in the range of 10 to 20% of the actual depth z(h).

According to an exemplary embodiment, the depth of the birds and/or the detectors may be between 5 and 50 m. However, those skilled in the art would understand that, as detector technology improves, these ranges may increase to over 250 m. Thus, the numbers presented herein are for exemplary purposes and not intended to limit the applicability of the exemplary embodiments.

Figure 10:
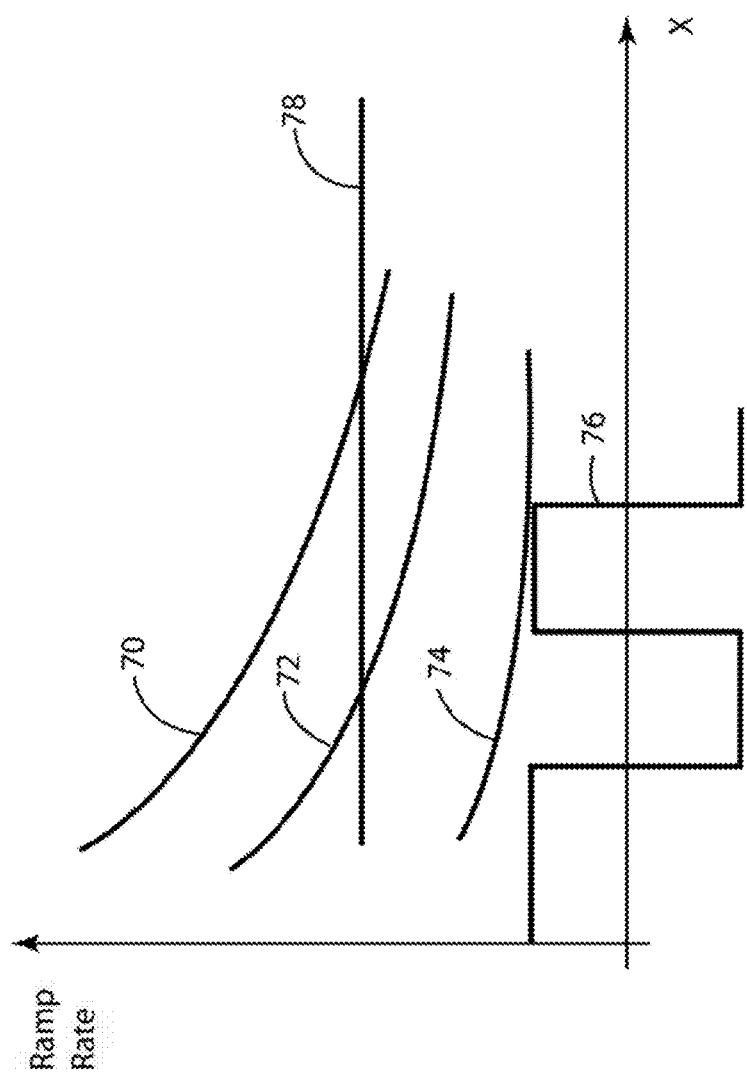
FIG. 10 is a graph showing ramp rate differences between a conventional streamer configuration and several novel streamer configurations according to the subject matter disclosed.

According to an exemplary embodiment, the curved profile of the streamer discussed above may be described in terms of a local ramp rate along the streamer. For example, consider corresponding slopes at various points along the streamer. If the change in the streamer's local slope (the ramp rate) is plotted as a function of a horizontal position along the length of the streamer on the X axis, as shown in FIG. 10, the different curves 70 to 76 describing the change of the ramp rate are characterized by the fact that they have at least two different ramp-rate values. This is in contrast to curve 78 that describes a slanted streamer having a constant slope (e.g., a slope that does not vary with the horizontal position of the detectors along the streamer). It is noted that the ramp rate may also increase along the X axis in FIG. 10.

Figure 11:
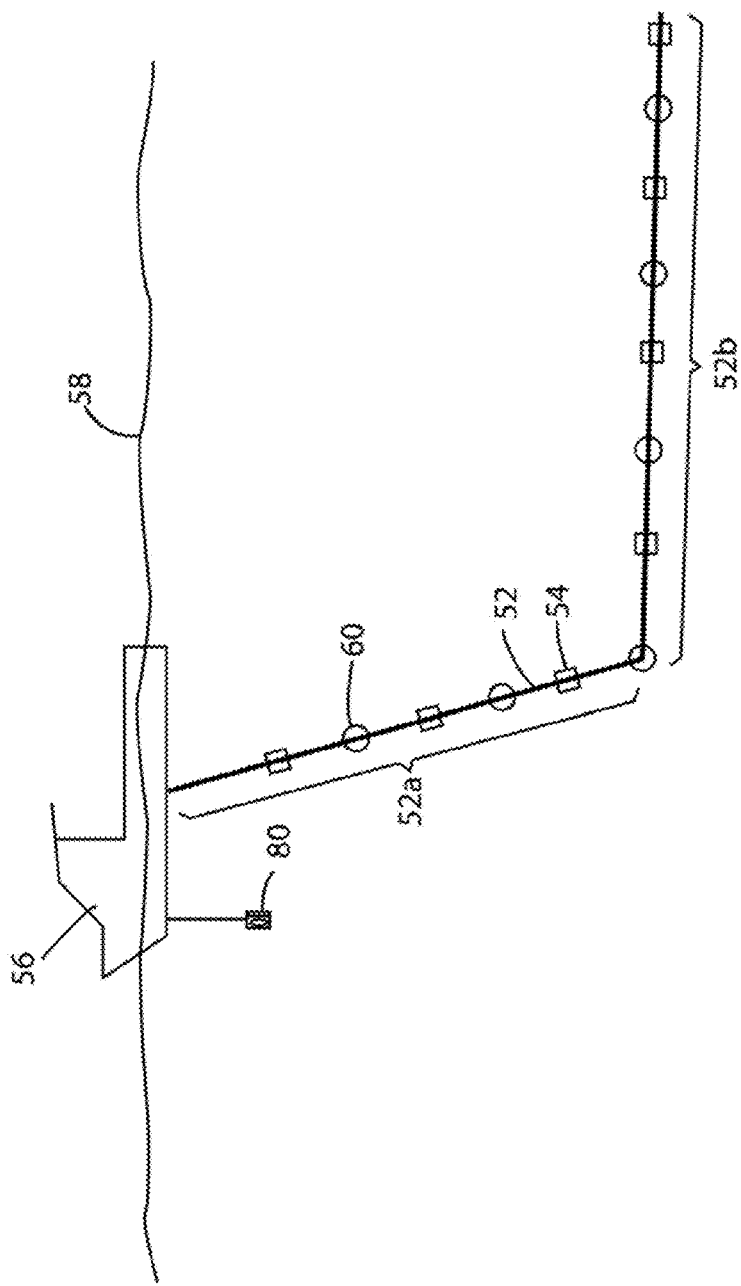
FIG. 11 is a schematic diagram of a seismic data acquisition system having a double slanted streamer according to an exemplary embodiment.

According to another exemplary embodiment, a streamer having a first region with a slanted configuration and a second region having a different slanted configuration is illustrated in FIG. 11. Such configuration allows sufficient notch dynamics to be obtained for shallow reflectors by using detectors lying at higher depths. The configuration shown in FIG. 11 has the first region 52a slanted at a predetermined angle and the second region 52b substantially horizontal.

In the embodiment shown in FIG. 11, the seismic receiver closest to a seismic source 80 lies at a depth of substantially 7.5 m. The first portion 52a may have a length of between 1 and 3 km, for example 2 km. The seismic receiver 54 of the first portion 52a that is farthest from the seismic source 80 lies at a depth of substantially 37.5 m. The second portion 52b being horizontal, the receivers 54 of the second portion 52b farthest from the source 80 also lie at a depth of about 37.5 meters. These values are given by way of illustration. The depth can be chosen in each case in relation to particular conditions (depth of the water section, geological characteristics, etc.).

FIGS. 12 and 13 illustrate some of the advantages of acquiring data with a novel streamer having a slanted first portion and a horizontal second portion. The effective spectra 92 and 96 shown in FIGS. 12 and 13 correspond to simulations including the ghosts for a shallow reflector similar to that discussed with regard to FIGS. 3 and 4. The spectrum simulations are for a streamer having the first detector placed relative to the surface of the water at a depth of about 7.5 m and about 15 m. In both of these simulations, the last detector on the slanted streamer is placed at a depth of about 37.5 m relative to the water surface. The simulated spectra (curves 90 and 94) neglect the ghost effect, i.e., they represent an "idealized" situation in which the presence of ghosts has been artificially removed from the simulation. As clearly shown, the calculated spectra 92 and 96 have shapes close to the effective spectra 90 and 94, respectively, when the low frequency and high frequency behaviour is considered, a result not obtained using the conventional approach shown in FIGS. 3 and 4.

Figure 1:
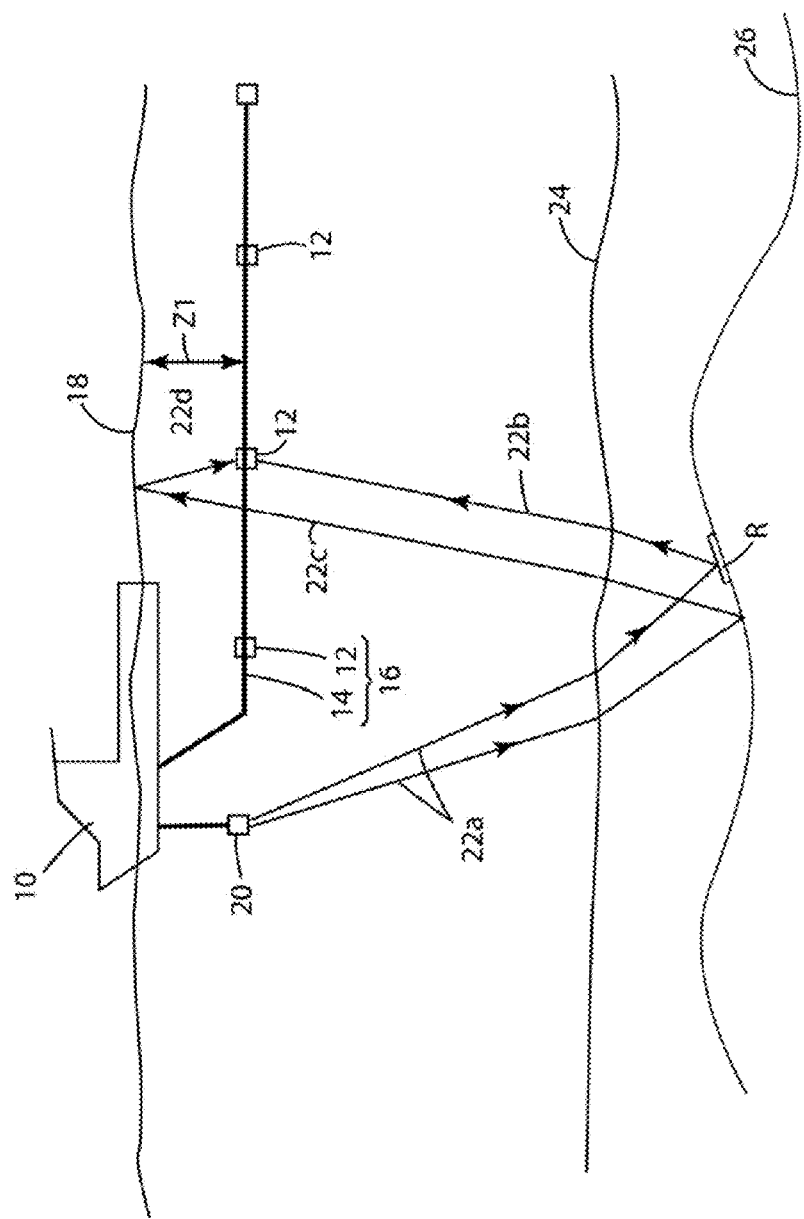
FIG. 1 is a schematic diagram of a conventional seismic data acquisition system having a horizontal streamer.
Figure 2:
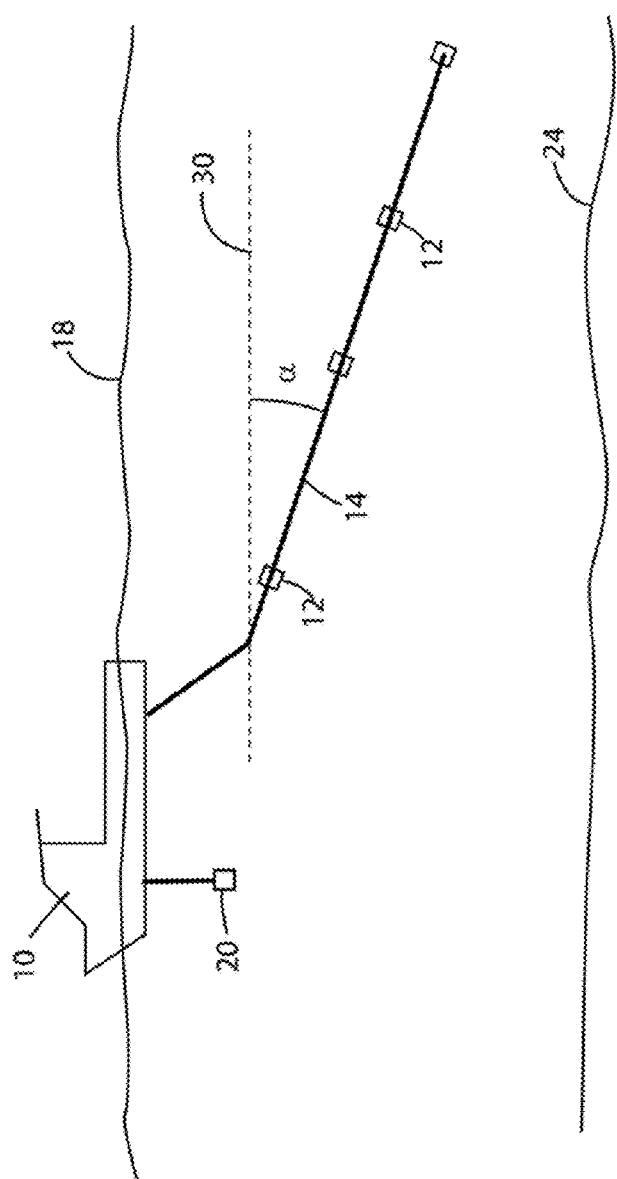
FIG. 2 is a schematic diagram of a conventional seismic data acquisition system having a slanted streamer.
Figure 4:
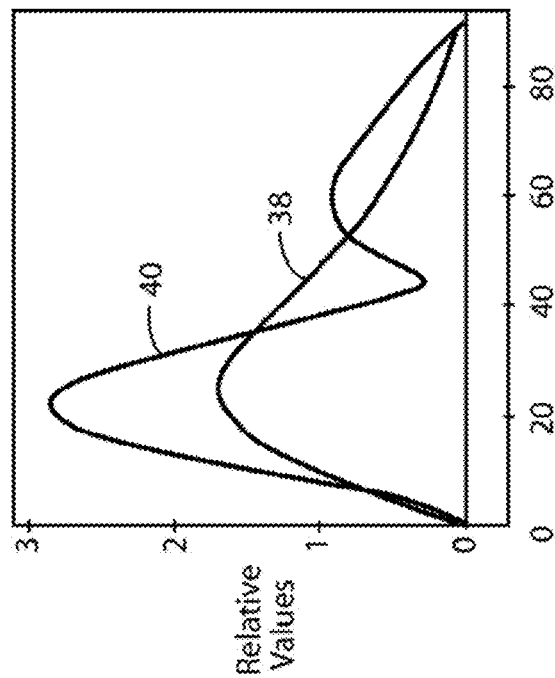
FIGS. 3 and 4 illustrate conventional frequency spectra for the data acquisition systems shown in FIG. 2 for two different depths.
Figure 3:
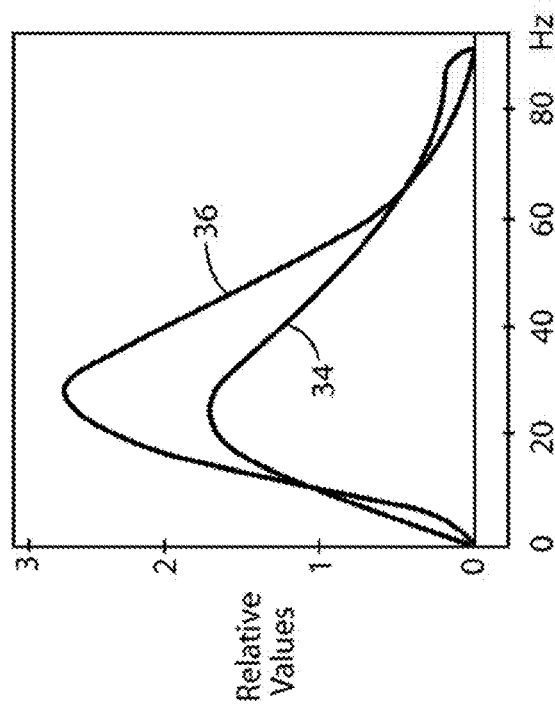

By comparing the ideal spectra and the effective spectra of FIGS. 12 and 13, it is observed that ghost elimination has been achieved, and the notch at 45 to 50 Hz is suitably filled, which again is an improvement compared to FIGS. 3 and 4.

According to an exemplary embodiment, the slanted first portion 52a has a slope of less than 2%. This slope avoids setting up turbulences which would be detrimental to the quality of the signals recorded by the seismic receivers. This slope is more preferably than 1% which provides a sufficient range of receiver depths to achieve good quality ghost elimination when processing.

Figure 14:
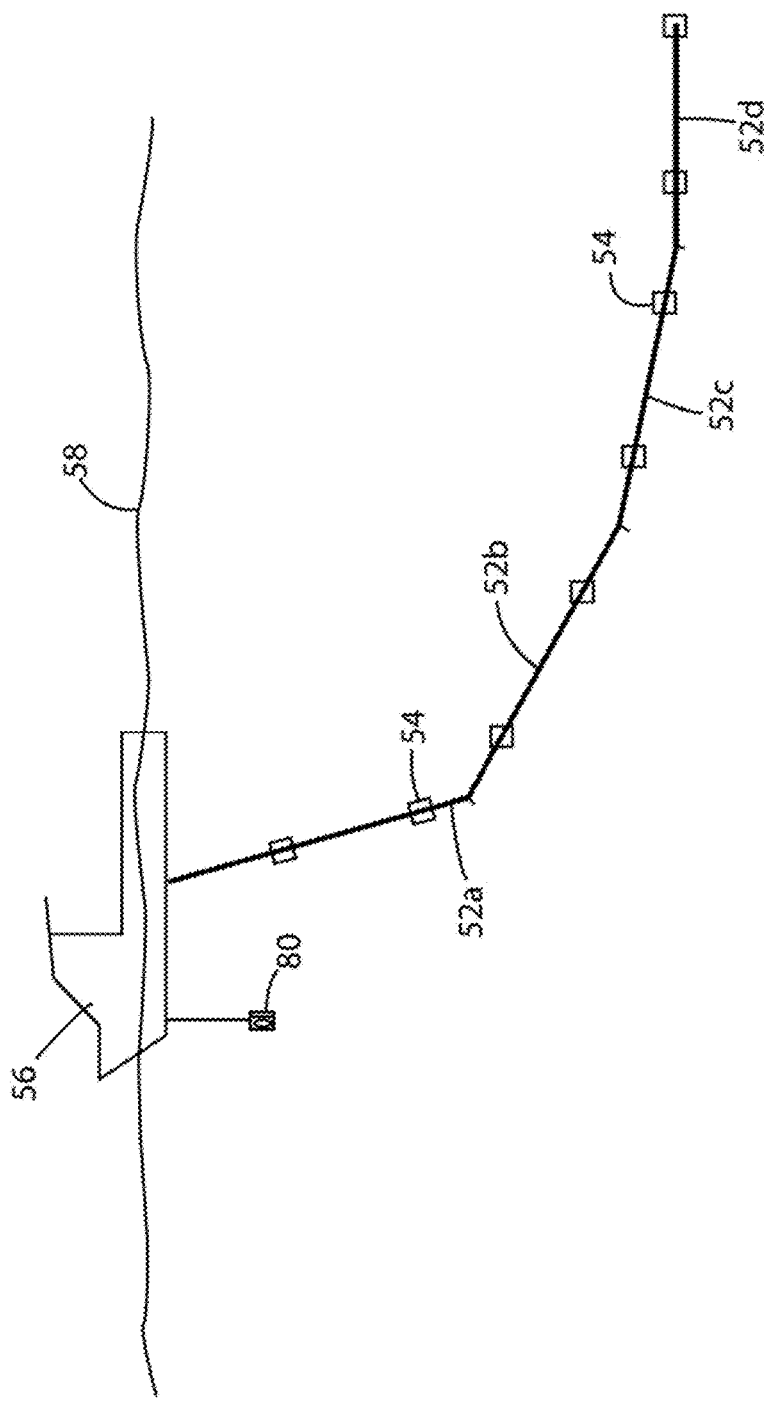
FIG. 14 is a schematic diagram of a seismic data acquisition system having a streamer with multiple slants according to an exemplary embodiment.

According to another exemplary embodiment illustrated in FIG. 14, the depth control birds 60 are adjusted so that the streamer 52 includes plural portions having different slopes. For example, FIG. 14 shows the streamer 52 having a first region 52a having a first slope, a second portion 52b having a second slope, a third region 52c having a third slope and a fourth portion 52d having a fourth slope. More or less portions may be employed and the slopes of these portions may be positive, negative, or a combination thereof. According to one variant of this embodiment, section 52d may be horizontal, i.e., a section having substantially no slant. According to another variant, different portions may form a single portion having a uniform slant.

The streamers may be solid streamers marketed by Sercel (Carquefou Cedex, France) under the trademark Sentinel, but the exemplary embodiments disclosed herein are applicable to other types of streamers. The depth control birds may be devices of Nautilus type (trademark registered by Sercel) which permit lateral positioning of the streamers, but other types of depth control devices can be used to implement the exemplary embodiments. The distances between adjacent receivers 54 are on the order of a few meters, and appropriately the distances between adjacent depth control birds may be between 200 and 400 meters.

It is noted that various combinations of the above-discussed embodiments are also envisioned to be novel and possible to be realized, e.g., a streamer with a combination of curved profile portions and multiple slanted portions.

According to an exemplary embodiment illustrated in FIG. 15, there is a method for seismic data acquisition related to a submerged subsurface. The method includes a step 1500 of towing a body having a predetermined length together with plural detectors provided along the body; a step 1502 of configuring plural birds provided along the body to float at a predetermined depth from a surface of the water such that a first portion of the body has a curved profile while being towed underwater; and a step 1504 of recording with the plural detectors the seismic data generated in the body of the water while towing the body. The curved profile may stay substantially unchanged while the vessel is towing the streamer due to the birds.

According to another exemplary embodiment illustrated in FIG. 16, there is a method for deploying a streamer for seismic data acquisition related to a submerged subsurface. The method includes a step 1600 of releasing into the body of water, from a vessel, a body having a predetermined length together with plural detectors provided along the body; a step 1602 of towing the body and the plural detectors such that the plural detectors are submerged; and a step 1604 of configuring plural birds provided along the body to float at a predetermined depth from a surface of the water such that a first portion of the body has a curved profile while being towed underwater.

The curved profile may be a parabola, a circle or a hyperbola, a second portion of the streamer may have a flat profile and is connected to the first portion, and the curved profile may be described by z(h), which is a depth of a point of the first portion relative to the surface of the water, and satisfies the following equation:

$$z(h) = z_0 + s_0 h\left(1 - 0.5\left(\frac{h}{h_c}\right)\right) \text{ for } h \leq h_c,$$

where h is a horizontal distance between the point and a first detector provided on the body, $z_0$ is a depth of the first detector relative to the surface of the water, $s_0$ is a slope of the body at the first detector of the streamer, and $h_c$ is a predetermined horizontal distance between the first detector and an end of the curved profile.

The method may include a step of towing a second portion, connected to the first portion, the second portion being described by equation $z(h)=z_0+s_0 \cdot 0.5 \cdot h_c$ for $h>h_c$. A projection of the entire body on a line substantially parallel to the surface of the water may be less than hc. In one application, the curved profile stays substantially the same during the towing.

The method may also include a step of towing a second portion, connected to the first portion, the second portion having birds and detectors and having a flat profile, wherein the second portion is substantially parallel to the surface of the water. In one application, no portion of the body, detectors or birds are anchored to the subsurface.

In one exemplary embodiment, there is a streamer for collecting seismic data related to a subsurface of a volume of water. The streamer includes a body having a predetermined length; plural detectors provided along the body; and plural birds provided along the body, wherein the streamer is configured to flow underwater when towed such that the plural detectors are distributed along a curved profile described by (i) a depth $z_0$ of a first detector, (ii) a slope $s_0$ of a first portion of the body with an axis parallel with a surface of the volume of water, and (iii) a predetermined horizontal distance $h_c$ between the first detector and an end of the curved profile.

In another exemplary embodiment, there is a streamer for collecting seismic data related to a subsurface of a body of water. The streamer includes a body having a predetermined length; plural detectors provided along the body; and plural birds provided along the body. The streamer is configured to flow underwater when towed such that the plural detectors are distributed along a first portion and a second portion of the body. The first portion has a slanted profile with a first slope and the second portion has a slanted profile with a second slope different from the first slope. In one application, the second slope is smaller than the first slope. In another application the second slope is substantially zero.

According to another exemplary embodiment, there is a streamer for collecting seismic data related to a subsurface of a body of water. The streamer includes a body having a predetermined length; plural detectors provided along the body; and plural birds provided along the body. The streamer is configured to flow underwater when towed such that the plural detectors are distributed along a first portion of the body, and the first portion has a slanted profile with a first detector configured to float deeper than a last detector of the first portion.

According to still another exemplary embodiment, there is a streamer for collecting seismic data related to a subsurface of a body of water. The streamer includes a body having a predetermined length; plural detectors provided along the body; and plural birds provided along the body. The streamer is configured to flow underwater when towed such that the plural detectors are distributed along a curved profile, wherein the curved profile has an initial slope larger than a slope at the end of the curved portion.

The disclosed exemplary embodiments provide a streamer and a method for seismic data acquisition. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A streamer for collecting seismic data related to a subsurface of a body of water, the streamer comprising:
a body having a predetermined length;
plural detectors provided along the body; and
plural birds provided along the body, wherein the birds are configured to float, when deployed under water, at predetermined depths from a surface of the water such that a first portion of the body assumes a non-linear, variable-depth profile while being towed underwater, the non-linear, variable-depth profile being a parameterized curve, and a set of birds of the plural birds being disposed along the non-linear variable-depth profile,
and the plural detectors being distributed along the parameterized curve at different depths from the surface of the water such that recorded seismic data has an increased low-frequency content relative to seismic data recorded with a same-depth streamer.

2. The streamer of claim 1, wherein the parameterized curve is one of a parabola, a circle or a hyperbola.

3. The streamer of claim 1, further comprising:
a second portion having a flat profile connected to the first portion.

4. The streamer of claim 1, wherein the non-linear, variable-depth profile is described by z(h), which is a depth of a point of the first portion relative to the surface of the water, and satisfies the following equation:

$$z(h) = z_0 + s_0 h \left(1 - 0.5\left(\frac{h}{h_c}\right)\right) \text{ for } h \leq h_c,$$

where h is a horizontal distance between the point and a first detector provided on the body, $z_0$ is a depth of the first detector relative to the surface of the water, $s_0$ is a non-zero slope of the body at the first detector of the streamer, and $h_c$ is a predetermined horizontal distance between the first detector and an end of the non-linear, variable-depth profile.

5. The streamer of claim 4, further comprising:
a second portion, connected to the first portion, the second portion being described by equation $z(h)=z_0+s_0 \cdot 0.5 \cdot h_c$ for $h > h_c$.

6. The streamer of claim 4, wherein a projection of the entire body on a line substantially parallel to the surface of the water is less than $h_c$.

7. The streamer of claim 1, wherein the non-linear, variable-depth profile stays substantially the same during the towing.

8. The streamer of claim 1, further comprising:
a second portion, connected to the first portion, the second portion having birds and detectors and having a flat profile.

9. The streamer of claim 8, wherein the second portion is substantially parallel to the surface of the water.

10. The streamer of claim 1, wherein the plural detectors include only hydrophones.

11. The streamer of claim 1, wherein no portion of the body, detectors or birds are anchored to the subsurface.

12. A method for seismic data acquisition related to a subsurface of a body of water, the method comprising:
towing a body having a predetermined length together with plural detectors provided along the body;
configuring plural birds provided along the body, to float at predetermined depths from a surface of the water such that a first portion of the body assumes a non-linear, variable-depth profile while being towed underwater, the non-linear, variable-depth profile being a parameterized curve, and a set of birds of the plural birds being disposed along the non-linear variable-depth profile; and
recording with the plural detectors the seismic data generated in the body of the water while towing the body, the plural detectors being distributed along the parameterized curve at different depths from the surface of the water such that recorded seismic data has an increased low-frequency content relative to seismic data recorded with a same-depth streamer.

13. The method of claim 12, wherein the parameterized curve is a parabola, a circle or a hyperbola.

14. The method of claim 12, wherein a second portion of the streamer has a flat profile and is connected to the first portion.

15. The method of claim 12, wherein the non-linear, variable-depth profile is described by z(h), which is a depth of a point of the first portion relative to the surface of the water, and satisfies the following equation:

$$z(h) = z_0 + s_0 h\left(1 - 0.5\left(\frac{h}{h_c}\right)\right) \text{ for } h \leq h_c,$$

where h is a horizontal distance between the point and a first detector provided on the body, $z_0$ is a depth of the first detector relative to the surface of the water, $s_0$ is a non-zero slope of the body at the first detector of the streamer, and $h_c$ is a predetermined horizontal distance between the first detector and an end of the non-linear, variable-depth profile.

16. The method of claim 15, further comprising:
towing a second portion, connected to the first portion, the second portion being described by equation $z(h)=z_0+s_0 \cdot 0.5 \cdot h_c$ for $h > h_c$.

17. The method of claim 15, wherein a projection of the entire body on a line substantially parallel to the surface of the water is less than $h_c$.

18. The method of claim 12, wherein the non-linear variable-depth profile stays substantially the same during the towing.

19. The method of claim 12, further comprising:
towing a second portion, connected to the first portion, the second portion having birds and detectors and having a flat profile.

20. A method for deploying a streamer for seismic data acquisition related to a subsurface of a volume of water, the method comprising:
releasing into the volume of water, from a vessel, a body having a predetermined length together with plural detectors provided along the body;
towing the body and the plural detectors such that the plural detectors are submerged; and
configuring plural birds provided along the body, to float at predetermined depths from a surface of the water such that a first portion of the body assumes a non-linear, variable-depth profile while being towed underwater, the non-linear, variable-depth profile being a parameterized curve, and a set of birds of the plural birds being disposed along the non-linear variable-depth profile,
the plural detectors being distributed along the parameterized curve at different depths from the surface of the water to achieve ghost elimination.

21. A streamer for collecting seismic data related to a subsurface of a body of water, the streamer comprising:
a body having a predetermined length;
plural detectors provided along the body; and
plural birds provided along the body,
wherein the birds are configured to float, when deployed under water, at predetermined depths from a surface of the water such that a first portion of the body assumes a non-linear, variable-depth profile while being towed underwater, the non-linear, variable-depth profile being a parameterized curve, and a set of birds of the plural birds being disposed along the non-linear variable-depth profile, and
the plural detectors being distributed along the parameterized curve at different depths from the surface of the water to achieve ghost elimination.

22. The streamer of claim 21, wherein the parameterized curve includes one of a parabola, a circle or a hyperbola.

23. The streamer of claim 21, further comprising:
a second portion having a flat profile connected to the first portion.

24. The streamer of claim 21, wherein the non-linear, variable-depth profile is described by z(h), which is a depth of a point of the first portion relative to the surface of the water, and satisfies the following equation:

$$z(h) = z_0 + s_0 h\left(1 - 0.5\left(\frac{h}{h_c}\right)\right) \text{ for } h \leq h_c,$$

where h is a horizontal distance between the point and a first detector provided on the body, $z_0$ is a depth of the first detector relative to the surface of the water, $s_0$ is a non-zero slope of the body at the first detector of the streamer, and $h_c$ is a predetermined horizontal distance between the first detector and an end of the non-linear, variable-depth profile.

25. The streamer of claim 24, further comprising:
a second portion, connected to the first portion, the second portion being described by equation $z(h)=z_0+s_0 \cdot 0.5 \cdot h_c$ for $h > h_c$.

26. The streamer of claim 24, wherein a projection of the entire body on a line substantially parallel to the surface of the water is less than $h_c$.

27. The streamer of claim 21, wherein the non-linear, variable-depth profile stays substantially the same during the towing.

28. The streamer of claim 21, further comprising:
a second portion, connected to the first portion, the second portion having birds and detectors and having a flat profile.

29. The streamer of claim 28, wherein the second portion is substantially parallel to the surface of the water.

30. The streamer of claim 21, wherein the plural detectors include only hydrophones.

* * * * *